United States Patent
Chi et al.

(10) Patent No.: US 10,534,177 B1
(45) Date of Patent: Jan. 14, 2020

(54) SCANNING ASSEMBLY WITH GRATINGS IN WAVEGUIDE DISPLAYS WITH A LARGE EYEBOX

(71) Applicant: Facebook Technologies, LLC, Menlo Park, CA (US)

(72) Inventors: Wanli Chi, Sammamish, WA (US); Hee Yoon Lee, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 209 days.

(21) Appl. No.: 15/728,743

(22) Filed: Oct. 10, 2017

(51) Int. Cl.
*G02B 27/01* (2006.01)
*G02B 26/10* (2006.01)
*F21V 8/00* (2006.01)

(52) U.S. Cl.
CPC ....... *G02B 27/0172* (2013.01); *G02B 6/0016* (2013.01); *G02B 6/0035* (2013.01); *G02B 6/0076* (2013.01); *G02B 26/106* (2013.01); *G02B 27/0176* (2013.01); *G02B 2027/012* (2013.01); *G02B 2027/0125* (2013.01); *G02B 2027/0152* (2013.01); *G02B 2027/0178* (2013.01)

(58) Field of Classification Search
CPC ......... G02B 27/01–0103; G02B 27/017–0172; G02B 2027/0105; G02B 2027/0112; G02B 2027/0174; G02B 2027/0178

USPC .................................. 359/13, 629–630, 634
See application file for complete search history.

(56) References Cited

U.S. PATENT DOCUMENTS

2019/0004219 A1* 1/2019 Tervo ................... G02B 5/1842
2019/0049899 A1* 2/2019 Gelman ............... G03H 1/2249

* cited by examiner

*Primary Examiner* — Robert E. Tallman
(74) *Attorney, Agent, or Firm* — Fenwick & West LLP

(57) ABSTRACT

A near-eye-display is used for presenting media to a user. The near-eye-display includes a light source assembly, a scanning assembly, one or more output waveguides, and a controller. The light source assembly emits light that is at least partially coherent. The scanning assembly includes grating elements associated with a wave vector that diffract the emitted light into several beams, and scan the beams in accordance with display instructions. The output waveguide includes several input areas, and an output area. Each input area includes one or more coupling elements associated with respective wave vectors that receive a respective beam. The output waveguide expands the beam at least along two dimensions to form expanded light for each respective beam toward a different portion of an eyebox with an overlap in at least some portions of the eyebox. The controller controls the scanning of the scanning assembly to form a two-dimensional image.

15 Claims, 5 Drawing Sheets

SCANNING ASSEMBLY WITH GRATINGS IN WAVEGUIDE DISPLAYS WITH A LARGE EYEBOX

BACKGROUND

The disclosure relates generally to near-eye-display systems, and more specifically to waveguide displays with scanning assembly that includes one or more grating elements to achieve a large eyebox.

Near-eye light field displays project images directly into a user's eye, encompassing both near-eye displays (NEDs) and electronic viewfinders. Factors like, e.g., brightness, resolution, and compactness are considered in conventional display designs of NEDs. Typical MEMS scanners use a collimated laser beam for scanning which can be high power and have a good efficiency to be directed to image location, and the image can be as bright as needed. Additionally, NEDs in virtual reality systems and/or augmented reality systems have a design criteria to be compact and light weight, and to provide a two-dimensional expansion with a large eyebox for ease of use. Furthermore, designing a conventional NED with two-dimensional expansion involving two different output grating elements that are spatially separated often result in a large form factor. Accordingly, it is very challenging to design NEDs using conventional methods to achieve a small form factor, and a large eyebox.

SUMMARY

A near-eye display is used for presenting media to a user. The near-eye display includes a light source assembly, a scanning assembly, one or more output waveguides, and a controller. The light source assembly emits image light that is at least partially coherent. The scanning assembly includes grating elements that diffract the emitted light into a plurality of beams, and scan the beams in accordance with display instructions. The output waveguide includes an output area and a plurality of input area. Each input area receives a respective beam of the plurality of beams. The output waveguide expands the beams at least along two dimensions to form expanded light for each respective beam, and outputs an expanded light toward a different portion of an eyebox (e.g., a location in space occupied by an eye of a user of the near-eye display). There may be an overlap in at least some portions of the eyebox. The controller generates display instructions to the light source assembly to form a two-dimensional image. In some embodiments, the waveguide display includes a source waveguide that receives the image light from the light source assembly along a first dimension and expand the emitted image light along a second dimension orthogonal to the first dimension.

In some embodiments, at least one of the plurality of input areas includes a blocking element that blocks a portion of the light emitted by the light source assembly.

Figure 1:
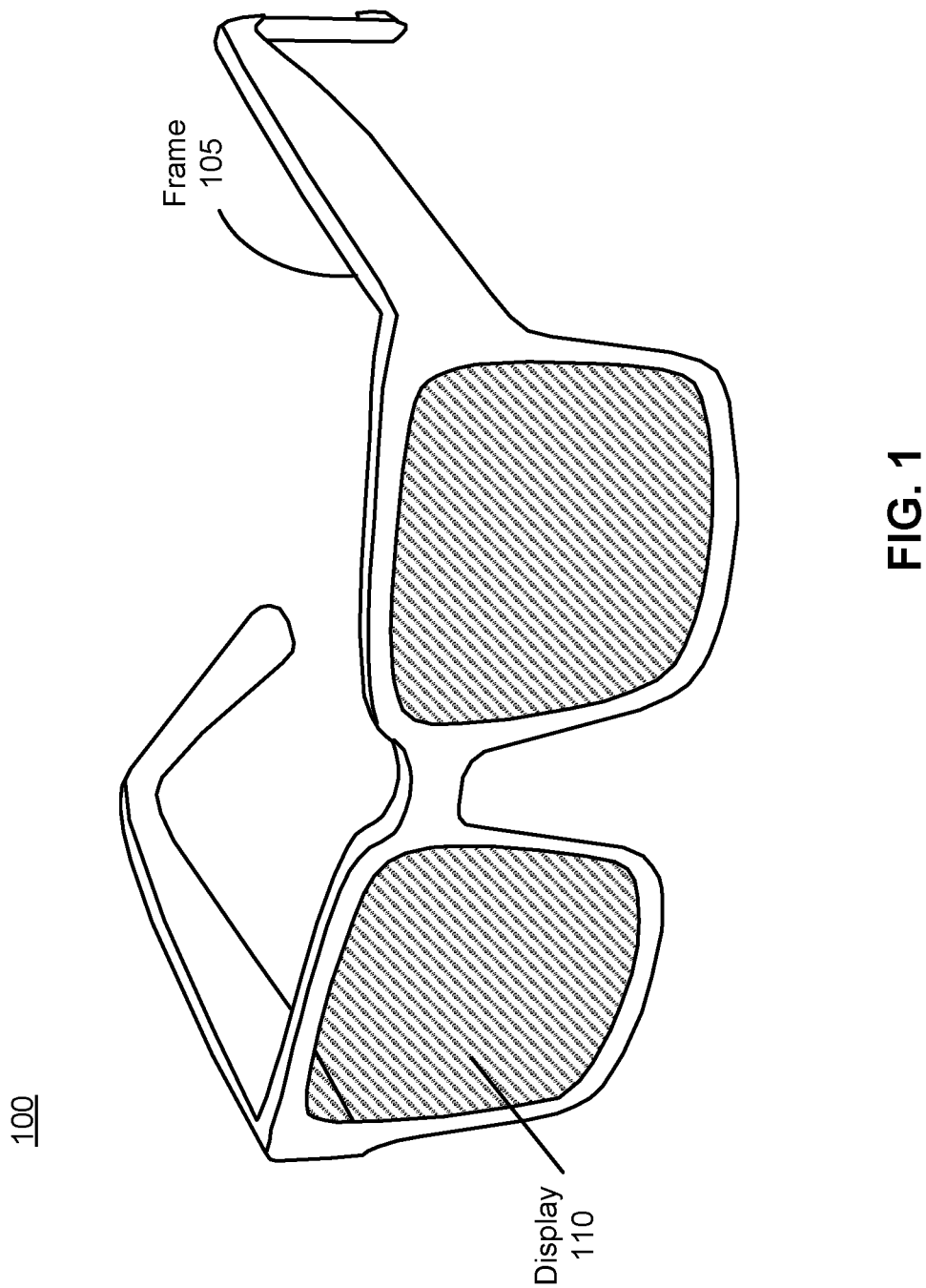
FIG. 1 is a diagram of a NED, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A NED is used for presenting media to a user. The NED includes a light source assembly, a scanning assembly, one or more output waveguides, and a controller. The light source assembly emits image light that is at least partially coherent. In some configurations, the light source assembly emits image light that is monochromatic. In alternate configurations, the light source assembly emits image light of a first band (e.g. red colored light) and image light of a second band (e.g. blue colored light) different from the first band. The scanning assembly includes grating elements associated with a wave vector that diffract the emitted light into a plurality of beams of different diffraction orders, and scan the beams in accordance with display instructions. The output waveguide includes several input areas, and an output area. Each input area includes one or more coupling elements associated with respective wave vectors that receive a respective beam of the plurality of beams. The output waveguide expands the beam at least along two dimensions to form expanded light for each respective beam toward a different portion of an eyebox, wherein there is an overlap in at least some portions of the eyebox. The controller controls the scanning of the scanning assembly to form a two-dimensional image.

A wave vector of a plane wave is a vector which points in the direction in which the wave propagates (perpendicular to the wave front associated with an image light) and its magnitude is inversely proportional to the wavelength of the light, defined to be $2\pi/\lambda$, where $\lambda$ is the wavelength of the light. In this disclosure, only the radial component of the wave vector (parallel to the waveguide surface) is used. For example, a light for a projector is associated with a radial wave vector ($k_{r0}$) which has a magnitude of zero for a normal incidence on a surface of the output waveguide. Radial component does not change as the light enters or exits the medium (e.g. waveguide). A grating vector is a vector whose direction is normal to the grating grooves and its vector size is inversely proportional to its pitch. In some configurations, the grating vector ($k_{grating}$) is defined to be $2\pi/p$, where p is the pitch of the grating. Since grating (e.g. surface relief grating) is on the waveguide surface, the grating vector is always parallel to the surface, and thus it affects only the radial component of the wave vector of the image light. Accordingly, the radial component of the wave vector ($k_r$) of an image light bouncing back and forth in the output waveguide is changed to $k_r = k_{r0} + \Sigma k_{grating}$, where $\Sigma k_{grating}$ is a vector sum of the grating vectors associated with the gratings in a waveguide.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1 is a diagram of a near-eye-display (NED) 100, in accordance with an embodiment. In some embodiments, the NED 100 may be referred to as a head-mounted display (HMD). The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as an artificial reality headset. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 is coupled to one or more optical elements which together display media to users. In some embodiments, the frame 105 may represent a frame of eye-wear glasses. The display 110 is configured for users to see the content presented by the NED 100. As discussed below in conjunction with FIGS. 2-5, the display 110 includes at least one display assembly (not shown) for directing one or more image light to an eye of the user. The display assembly includes a waveguide display with a scanning assembly having grating elements that diffract the emitted light into a plurality of beams of different diffraction orders, and scan the beams in accordance with display instructions. Each of the plurality of beams is coupled into an output waveguide (not shown) of the waveguide display, and the output waveguide expands each of the plurality of beams at least along two dimensions to form expanded light for each respective beam. The grating elements split the plurality of beams into different angles. This way, different color channels inside the NED 100 may be directed to different input gratings of different waveguides. Accordingly, the display assembly, relative to conventional systems, has a reduction in the formation of ghost images from the crosstalk between different color channels inside the NED 100.

Figure 2:
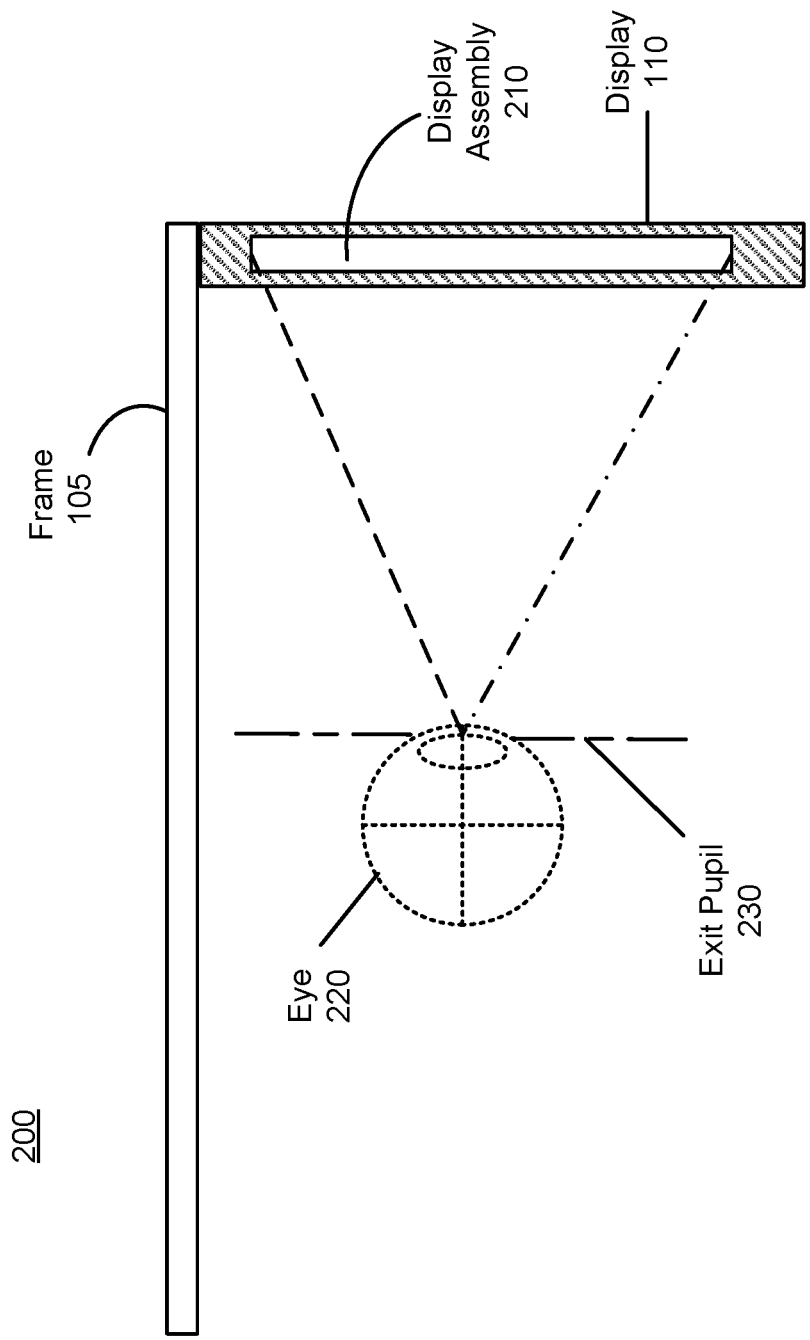
FIG. 2 is a cross-section of the NED illustrated in FIG. 1, in accordance with an embodiment.

FIG. 2 is a cross-section 200 of the NED 100 illustrated in FIG. 1, in accordance with an embodiment. The display 110 includes at least one display assembly 210. An exit pupil 230 is a location where the eye 220 is positioned in an eyebox region when the user wears the NED 100. For purposes of illustration, FIG. 2 shows the cross section 200 associated with a single eye 220 and a single display assembly 210, but in alternative embodiments not shown, another display assembly which is separate from the display assembly 210 shown in FIG. 2, provides image light to an eyebox located at an exit pupil of another eye 220 of the user.

The display assembly 210, as illustrated below in FIG. 2, is configured to direct the image light to an eyebox located at an exit pupil 230 of the eye 220. The display assembly 210 may be composed of one or more materials (e.g., plastic, glass, etc.) with one or more refractive indices that effectively minimize the weight and widen a field of view (hereinafter abbreviated as 'FOV') of the NED 100. As described below in conjunction with FIGS. 3-5, the display assembly 210 includes a scanning assembly having grating elements that diffract the emitted light into a plurality of beams of different diffraction orders, and an output waveguide (not shown) expands each of the plurality of beams at least along two dimensions to form expanded light for each respective beam toward a different portion of an eyebox (e.g., a location in space occupied by an eye of a user of the near-eye display), wherein there is an overlap in at least some portions of the eyebox. Each of the grating elements may be coated with a metal such that a first band of light (e.g. blue colored light) emitted by the display assembly 210 is selectively in-coupled at a particular coupling element (of the output grating) and light in a different band is selectively in-coupled at some other coupling element (of the output grating).

In some configurations, the NED 100 includes one or more optical elements between the display assembly 210 and the eye 220. The optical elements may act to, e.g., correct aberrations in image light emitted from the display assembly 210, magnify image light emitted from the display assembly 210, some other optical adjustment of image light emitted from the display assembly 210, or some combination thereof. The example for optical elements may include an aperture, a Fresnel lens, a convex lens, a concave lens, a filter, or any other suitable optical element that affects image light.

Figure 3:
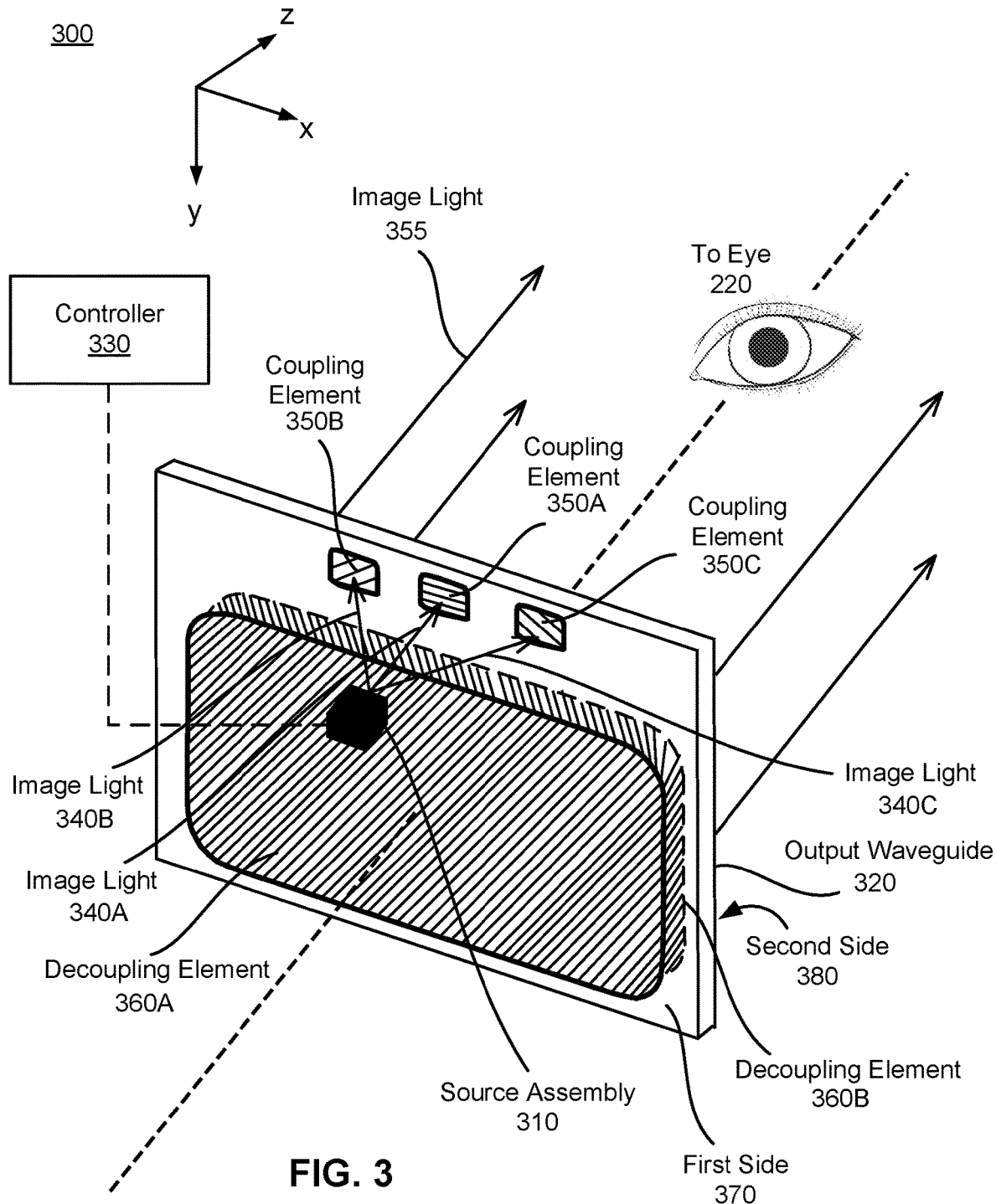
FIG. 3 illustrates an isometric view of a waveguide display with a source assembly, in accordance with an embodiment.

FIG. 3 illustrates an isometric view of a waveguide display 300 with a source assembly 310, in accordance with an embodiment. In some embodiments, the waveguide display 300 is a component (e.g., display assembly 210) of the NED 100. In alternate embodiments, the waveguide display 300 is part of some other NED, or other system that directs display image light to a particular location.

The waveguide display 300 includes a source assembly 310, an output waveguide 320, and a controller 330. For purposes of illustration, FIG. 3 shows the waveguide display 300 associated with a single eye 220, but in some embodiments, another waveguide display separate (or partially separate) from the waveguide display 300, provides image light to another eye of the user. In a partially separate system, one or more components may be shared between waveguide displays for each eye. The source assembly 310 generates image light 340A, 340B and 340C.

The source assembly 310 generates light in accordance with display instructions from the controller 330. The source assembly 310 includes a light source, and an optics system. The light source is a source of light that generates at least a coherent or partially coherent image light. The light source may be, e.g., a laser diode, a vertical cavity surface emitting laser, a light emitting diode, a tunable laser, or some other light source that emits coherent or partially coherent light. The light source emits light in a visible band (e.g., from about 390 nm to 700 nm), and it may emit light that is continuous or pulsed. In some embodiments, the light source may be a laser that emits light at a particular wavelength (e.g., 532 nanometers). The light source emits light in accordance with one or more illumination parameters received from the controller 330. An illumination parameter is an instruction used by the light source to generate light. An illumination parameter may include, e.g., source wavelength, pulse rate, pulse amplitude, beam type (continuous or pulsed), other parameter(s) that affect the emitted light, or some combination thereof.

The optics system includes one or more optical components that condition the light from the light source. Conditioning light from the light source may include, e.g., expanding, collimating, adjusting orientation in accordance with instructions from the controller 330, some other adjustment of the light, or some combination thereof. The one or more optical components may include, e.g., lenses, mirrors, apertures, gratings, or some combination thereof. As described below in conjunction with FIGS. 4 and 5, the optics system includes a scanning assembly (not shown here) having grating elements that diffract the light from the light source into a plurality of beams, and the output waveguide 320 expands the beam at least along two dimensions to form expanded light for each respective beam toward a different portion of an eyebox (e.g., a location in space occupied by an eye of a user of a near-eye display), wherein there is an overlap in at least some portions of the eyebox.

The source assembly 310 generates and outputs image light 340A to a coupling element 350A, image light 340B to a coupling element 350B, and image light 340C to a coupling element 350C of the output waveguide 320. In alternate embodiments, the light waveguide display 300 includes a plurality of source assemblies 310.

The output waveguide 320 is an optical waveguide that outputs image light 355 to an eye 220 of a user. The output waveguide 320 receives the image light 340A, 340B, 340C at the coupling elements 350A, 350B, and 350C, respectively, and guides the received input image light to one or more decoupling elements 360A and 360B. The coupling element 350A may be, e.g., a diffraction grating, a holographic grating, one or more cascaded reflectors, one or more prismatic surface elements, an array of holographic reflectors, and some combination thereof. For example, in embodiments where the coupling element 350A is diffraction grating, the pitch of the diffraction grating is chosen such that total internal reflection occurs, and the image light from the source assembly 310 propagates internally toward the decoupling element 360A. For example, the pitch of the diffraction grating may be in the range of 300 nm to 600 nm. Each of the coupling elements 350B and 350C is an embodiment of the coupling element 350A. Note that the output waveguide 320 has a larger eyebox (e.g. 20 mm×10 mm) when compared to a conventional output waveguide with a single coupling element.

The decoupling element 360 decouples the image light 355 from the output waveguide 320. The decoupling elements 360 may be, e.g., a diffraction grating, or a holographic grating, one or more cascaded reflectors, one or more prismatic surface elements, an array of holographic reflectors, and some combination thereof. For example, in embodiments where the decoupling element 360 is a diffraction grating, the pitch of the diffraction grating is chosen to cause incident image light to exit the output waveguide 320. An orientation and position of the image light exiting from the output waveguide 320 is controlled by changing an orientation and position of the image light 340 entering the coupling element 350. For example, the pitch of the diffraction grating may be in the range of 300 nm to 600 nm.

The output waveguide 320 may be composed of one or more materials that facilitate total internal reflection of the image light received from the source assembly 310. The output waveguide 320 may be composed of e.g., silicon, plastic, glass, or polymers, or some combination thereof. The output waveguide 320 has a relatively small form factor. For example, the output waveguide 320 may be approximately 50 mm wide along X-dimension, 30 mm long along Y-dimension and 0.5-1 mm thick along Z-dimension.

The controller 330 determines display instructions for the source assembly 310. Display instructions are instructions to render one or more images. In some embodiments, display instructions may simply be an image file (e.g., bitmap). The display instructions may be received from, e.g., a console of an artificial reality system. Display instructions are instructions used by the source assembly 310 to generate image light. The display instructions may include, e.g., a type of a source of image light (e.g. monochromatic, polychromatic), a scanning rate, an orientation of a scanning apparatus, one or more illumination parameters (described below with reference to FIG. 4), and some combination thereof. The controller 330 includes a combination of hardware, software, and/or firmware not shown here so as not to obscure other aspects of the disclosure.

In some embodiments, the waveguide display 300 includes the source assembly 310, the output waveguide 320, and the controller 330. The source assembly 310 generates and outputs image light to the output waveguide 320. The source assembly 310 outputs an image light to the coupling element 350A, 350B and 350C of the output waveguide 320.

Figure 4:
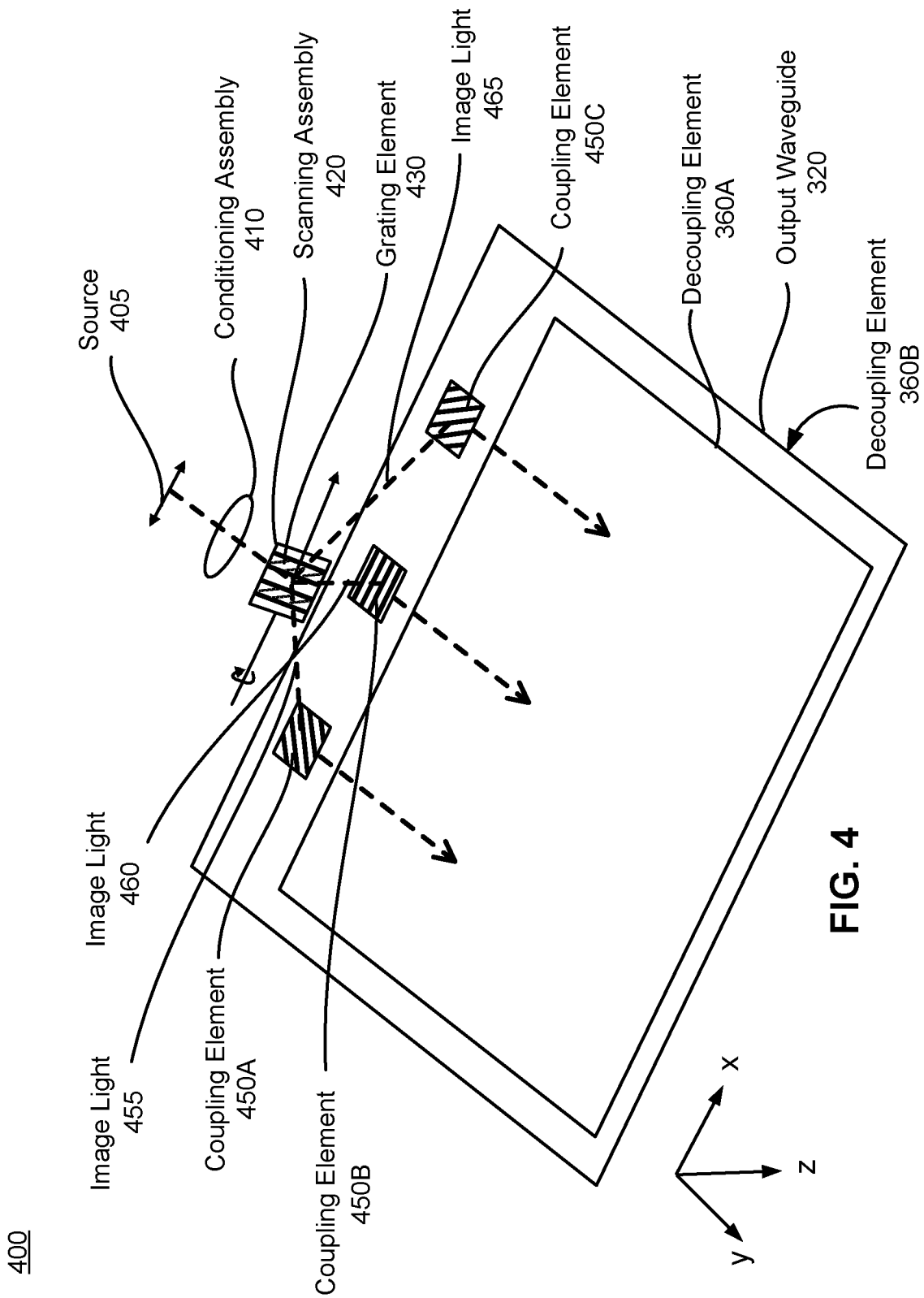
FIG. 4 illustrates an isometric view of a waveguide display with a scanning assembly and a single output waveguide, in accordance with an embodiment.

FIG. 4 illustrates an isometric view of a waveguide display 400 with a scanning assembly 420 and a single output waveguide 320, in accordance with an embodiment. The waveguide display 400 is an embodiment of the waveguide display 300 of FIG. 3.

The waveguide display 400 includes the output waveguide 320, the source 405, a conditioning assembly 410, and a scanning assembly 420. For purposes of illustration, FIG. 4 shows the waveguide display 400 associated with a single eye 220, but in some embodiments, another waveguide display separate (or partially separate) from the waveguide display 400, provides image light to another eye of the user. In a partially separate system, one or more components may be shared between waveguide displays for each eye.

As described above in conjunction with FIG. 3, the source 405 is a source of light that generates at least a coherent or partially coherent image light. The conditioning assembly 410 conditions incident light. The conditioning assembly 410 includes one or more optical elements that condition light. The conditioning assembly 410 outputs a conditioned light (not shown here). Conditioning light may include, e.g., collimating, error correction, beam adjustment (e.g., expansion contraction), beam direction, some other operation which prepares light for the scanning assembly 420, or some combination thereof. For example, in some embodiments, the conditioning assembly 410 collimates the incident light to output a conditioned light to the scanning assembly 420.

The scanning assembly 420 is a set of optical elements that scan an incident light in at least along one dimension based on display instructions from a controller (not shown here). The scanning assembly 420 includes optical elements that redirect image light via diffraction. In some configurations, the optical element is a grating element formed as part of a Micro Electro Mechanical System (MEMS) device. For example, the optical element may be a reflective grating element formed on at least a one-dimensional MEMS mirror that scans and diffracts light from the conditioning assembly 410. In some embodiments, the scanning assembly 420 scans the optical element in at least two dimensions (e.g. horizontal and vertical dimensions). The scanning assembly 420 diffracts a plurality of image lights (in accordance with the display instructions) toward different portions of the output waveguide 320. In the example of FIG. 4, the scanning assembly 420 diffracts image lights 455, 460, and 465 toward the output waveguide 320.

The pitch of the grating element 430 is chosen to cause incident light to exit the output waveguide 320 at specific angles of inclination to the surface of the output waveguide 320 as a function of wavelength. For example, in FIG. 4, the pitch is such that the image light is split into different diffractive orders that are incident at the coupling elements 450A-C. Different incidence angles between different diffractive orders corresponding to a FOV may be compensated by the coupling elements 450A, 450B, and 450C by varying the orientation angle and the pitch of the coupling elements 450A, 450B, and 450C. Accordingly, the FOV is altered (split) by the grating element 430, but it is corrected by the corresponding coupling elements 450A, 450B, and 450C right away.

For example, the pitch of the diffraction grating may be in the range of 300 nm to 600 nm. The grating element 430 is a diffraction grating, including, but not restricted to, a surface-relief grating, a holographic grating, etc.

The scanning assembly 420 performs an array translation of pixel positions to achieve a desired frame rate in accordance with the light outputted by the source 405. For example, the scanning assembly 420 moves by one pixel position from a first instance of time to a second instance of time based on the desired level of brightness from the given number of pixel positions of the source 405. In another example, the scanning assembly 420 performs an overlaying of RGB pixels with a time delay shorter than the response time of a human eye to direct a full colored image light.

The output waveguide 320 is an optical waveguide that outputs image light to different portions of an eyebox. The output waveguide 320 receives the image light 455, 460, and 465 at the coupling elements 450A, 450B, and 450C, respectively, and guides the received input light to one or more decoupling elements 360A and 360B. Each of the coupling elements 450A, 450B, and 450C is an embodiment of the coupling element 350, as described above in conjunction with FIG. 3.

In the embodiment of FIG. 4, each of the coupling elements 450A, 450B, and 450C is designed based on the wave vector associated with the scanning assembly 420. In one example, the coupling element 450A is associated with a first wave vector ($k_{i1}$), the coupling element 450B is associated with a second wave vector ($k_{i2}$), the coupling element 450C is associated with a third wave vector ($k_{i3}$), and the grating element 430 is associated with a grating wave vector ($k_m$). In some configurations, the grating element 430 diffracts the light outputted by the source 405 to a negative first order and the coupling element 450A diffracts the image light 455. In a different configuration, the grating element 430 diffracts the light outputted by the source 405 to a zeroth order and the coupling element 450B diffracts the image light 460. In another configuration, the grating element 430 diffracts the light outputted by the source 405 to a first order and the coupling element 450C diffracts the image light 465. The grating element 430, and the coupling elements 450A, 450B, and 450C are designed such that a wave vector associated with the coupling element 450B matches both the difference of the wave vectors associated with the coupling element 450A and the grating element 430, and the sum of the wave vectors associated with the coupling element 450C and the grating element 430.

Note that such a design of coupling elements 450A, 450B, and 450C and the scanning assembly 420 would result in image light exiting the output waveguide 320 toward different portions of the eyebox in the exit pupil of the user's eye with an overlap in at least some portions of the eyebox. For example, the output waveguide 320 outputs an image light to an eyebox with an area of at least 20 mm along the X-dimension and 10 mm along the Y-dimension. In some configurations, the eyebox may be associated with an overlap of eyebox between different incident pupils along the X-dimension. For example, each of them may have a dimension of 10 mm×10 mm, but with 5 mm overlap along the X-dimension between them, and the resulting eyebox may be 20×10 mm.

Figure 5:
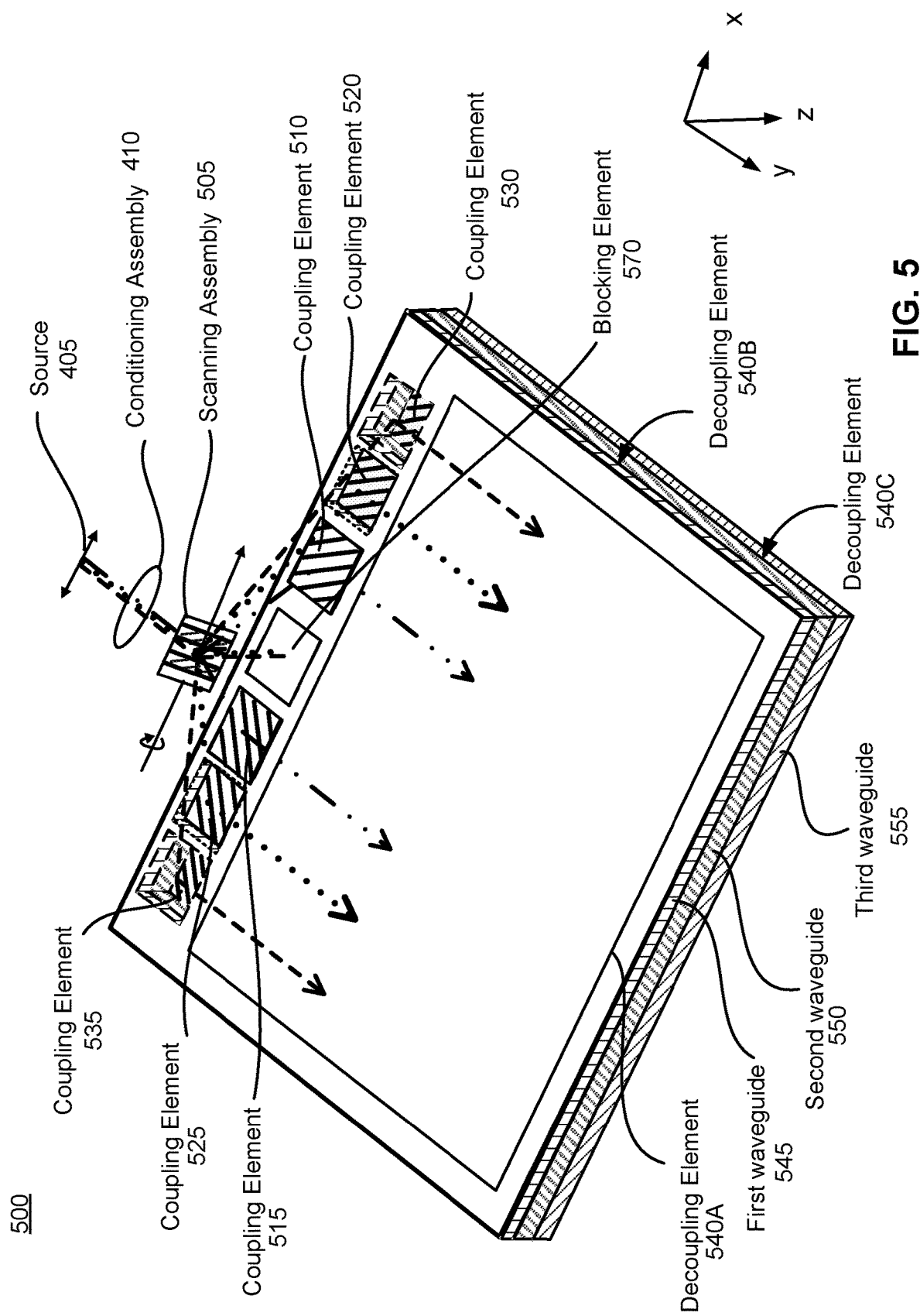
FIG. 5 illustrates an isometric view of a waveguide display with a scanning assembly and a plurality of output waveguides, in accordance with an embodiment.

FIG. 5 illustrates an isometric view of a waveguide display 500 with the scanning assembly 420 and a plurality of output waveguides, in accordance with an embodiment.

The waveguide display 500 includes the source 405, the conditioning assembly 410, a scanning assembly 505, a first waveguide 545, a second waveguide 550, and a third waveguide 555. For purposes of illustration, FIG. 5 shows the waveguide display 500 associated with a single eye 220, but in some embodiments, another waveguide display separate (or partially separate) from the waveguide display 500, provides image light to another eye of the user. In a partially separate system, one or more components may be shared between waveguide displays for each eye.

As described above in conjunction with FIGS. 3-4, the source 405 is a source of light that generates at least a coherent or partially coherent image light. The conditioning assembly 410 conditions incident light. The conditioning assembly 410 includes one or more optical elements that condition light. The conditioning assembly 410 outputs conditioned light (not shown here) to the scanning assembly 420.

The scanning assembly 505 is a set of optical elements that scan an incident light in at least along one dimension based on display instructions from a controller (not shown here). The scanning assembly 505 includes optical elements that redirect image light via one or more reflective portions of the scanning assembly 505 based on specific orientations of the reflective portions. For example, the optical elements may include one or more scanning mirrors that scan an incident image light. In some embodiments, the scanning assembly 505 includes a scanning mirror that scans in the vertical dimension. The scanning assembly 505 reflects a plurality of image lights at a particular orientation (in accordance with the display instructions) toward the output waveguide 320. In the example of FIG. 5, the scanning assembly 505 reflects image lights toward the first waveguide 545, the second waveguide 550, and the third waveguide 555.

Each of the first waveguide 545, the second waveguide 550, and the third waveguide 555 is an optical waveguide that outputs image light to an eyebox. The first waveguide 545 receives respective beams of image light at the coupling elements 510 and 515, and guides the received beams of image lights to the decoupling element 540A. The second waveguide 550 receives respective beams of image lights at the coupling elements 520 and 525, and guides the received beams of image lights to the decoupling element 540B. The third waveguide 555 receives respective beams of image lights at the coupling elements 530 and 535, and guides the received beams of image lights to the decoupling element 540C. Each of the first waveguide 545, the second waveguide 550, and the third waveguide 555 expands the received beams of image lights at least along two dimensions to form expanded image light. Each of the decoupling elements 540A, 540B, and 540C decouple the expanded image light toward the eyebox (e.g., a location in space occupied by an eye of a user of the near-eye display) associated with each of the first waveguide 545, the second waveguide 550, and the third waveguide 555.

In some configurations, each of the coupling elements 510, and 515 is located on the top surface of the first waveguide 545 extending along the X-Y plane. Each of the coupling elements 520 and 525 is located in a recessed portion of the second waveguide 550. Each of the coupling elements 530 and 535 is located in a recessed portion of the third waveguide 555. For example, the coupling elements 510 and 515 may be located at a first depth (e.g. zero micron) along the Z-dimension of the first waveguide 545, the coupling elements 520 and 525 may be located at a second depth along the Z-dimension in the recessed portion of the second waveguide 550, and the coupling elements 530 and 535 may be located at a third depth along the Z-dimension in the recessed portion of the third waveguide 555.

Each of the coupling elements 510, 515, 520, 525, 530, and 535 is an embodiment of the coupling element 350, and each of the decoupling elements 540A, 540B, and 540C is an embodiment of the decoupling element 360, as described above in conjunction with FIG. 3. In one example, the first waveguide 545 outputs image light that is a blue colored light (e.g. $\lambda=460$ nm), the second waveguide 550 outputs image light that is a green colored light (e.g. $\lambda=530$ nm), and the third waveguide 555 outputs image light that is a red colored light (e.g. $\lambda=630$ nm).

In the embodiment of FIG. 5, each of the coupling elements 510, 515, 520, 525, 530, and 535 is designed based on the wave vector associated with the scanning assembly 420. Note that such a design of coupling elements 510, 515, 520, 525, 530, and 535 and the scanning assembly 420 would result in image light exiting the first waveguide 545 toward the eyebox in the exit pupil of the user's eye with an area in the range of 100 to 200 millimeter square.

In some embodiments, the first waveguide 545 may optionally include a blocking element 570 that blocks a portion of the light emitted by the source 405. In one example, the blocking element 570 blocks a portion of the image light generated by the source 405 in order to block a portion of the light corresponding to a zeroth order diffracted beam.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A near-eye display, comprising:
    a light source assembly configured to emit light that is at least partially coherent;
    a scanning assembly comprising one or more grating elements, wherein the one or more gratings diffract the emitted light into a plurality of beams, and scan the beams in accordance with display instructions;
    an output waveguide including an output area and a plurality of input areas and each of the plurality of input areas is configured to receive a respective beam of the plurality of beams, and the output waveguide is configured to expand the beams at least along two dimensions to form expanded image light for each respective beam, and output the expanded image light for each respective beam toward a different portion of an eyebox, wherein there is at least some overlap in at least some of the different portions of the eyebox; and
    a controller configured to generate the display instructions and provide the display instructions to the scanning assembly.

2. The near-eye display of claim 1, wherein at least one of the plurality of input areas comprises a blocking element configured to block a zeroth order diffracted beam from the light emitted by the light source assembly.

3. The near-eye display of claim 1, wherein each of the plurality of input areas comprises at least a coupling element configured to guide the respective beam of the plurality of beams to the output area.

4. The near-eye display of claim 1, wherein the input area includes a first coupling element, a second coupling element, and a third coupling element selected from a group consisting of: a diffraction grating, a surface-relief grating, a holographic grating, and some combination thereof.

5. The near-eye display of claim 4, wherein the scanning assembly is associated with a grating wave vector, the first coupling element is associated with a first wave vector, the second coupling element is associated with a second wave vector, the second wave vector equal to a difference of the first wave vector and the grating wave vector.

6. The near-eye display of claim 5, wherein the third coupling element is associated with a third wave vector, the second wave vector equal to a sum of the third wave vector and the grating wave vector.

7. The near-eye display of claim 1, wherein the scanning assembly comprises one or more reflective grating elements coupled to a microelectromechanical system.

8. The near-eye-display of claim 1, further comprising:
a second output waveguide including an output area and an input area and each input area is configured to receive a respective beam of the plurality of beams, and each output waveguide is configured to expand the beams at least along the two dimensions to form expanded image light for each respective beam, and output the expanded image light for each respective beam toward a different portion of the eyebox, wherein there is at least some overlap in at least some of the different portions of the eyebox.

9. An output waveguide, comprising:
an output area; and
a plurality of input areas,
wherein, each of the plurality of input areas is configured to receive a respective beam of a plurality of beams from a scanning assembly comprising one or more grating elements that diffract light emitted by a light source assembly into the plurality of beams, and the output waveguide is configured to expand the beams at least along two dimensions to form expanded image light for each respective beam, and output the expanded image light for each respective beam toward a different portion of an eyebox, wherein there is at least some overlap in at least some of the different portions of the eyebox.

10. The output waveguide of claim 9, wherein at least one of the plurality of input areas comprises a blocking element configured to block a zeroth order diffracted beam from the light emitted by the light source assembly.

11. The output waveguide of claim 9, wherein each of the plurality of input areas comprises at least a coupling element configured to guide the respective beam of the plurality of beams to the output area.

12. The output waveguide of claim 10, wherein the input area includes a first coupling element, a second coupling element, and a third coupling element selected from a group consisting of: a diffraction grating, a surface-relief grating, a holographic grating, and some combination thereof.

13. The output waveguide of claim 11, wherein the scanning assembly is associated with a grating wave vector, the first coupling element is associated with a first wave vector, the second coupling element is associated with a second wave vector, the second wave vector equal to a difference of the first wave vector and the grating wave vector.

14. The output waveguide of claim 12, wherein the third coupling element is associated with a third wave vector, the second wave vector equal to a sum of the third wave vector and the grating wave vector.

15. The output waveguide of claim 9, wherein the scanning assembly comprises one or more reflective grating elements coupled to a microelectromechanical system.

* * * * *